(12) United States Patent
Weigel (10) Patent No.: US 7,144,207 B2
(45) Date of Patent: Dec. 5, 2006

(54) FLUID CHUCK DEVICE AND METHOD

(75) Inventor: Matthew J. Weigel, Enumclaw, WA (US)

(73) Assignee: The Boeing Company, Chicago, IL (US)

(*) Notice: Subject to any disclaimer, the term of this patent is extended or adjusted under 35 U.S.C. 154(b) by 385 days.

(21) Appl. No.: 10/628,232

(22) Filed: Jul. 29, 2003

(65) Prior Publication Data

US 2005/0025585 A1 Feb. 3, 2005

(51) Int. Cl.
*B23Q 11/10* (2006.01)
(52) U.S. Cl. .................. 408/56; 279/20; 408/1 R; 251/112; 251/221
(58) Field of Classification Search ............... 279/20; 408/56, 57, 141, 1 R; 409/136; 251/112, 251/215, 221; 137/340, 382
See application file for complete search history.

(56) References Cited

U.S. PATENT DOCUMENTS

| 1,383,306 | A | * | 7/1921 | Jacques | 285/277 |
| 2,985,468 | A | * | 5/1961 | Shaw et al. | 285/190 |
| 3,242,819 | A | * | 3/1966 | Erikson | 409/233 |
| 3,487,748 | A | * | 1/1970 | Grage | 409/136 |
| 3,643,969 | A | * | 2/1972 | Finley et al. | 279/4.08 |
| 3,727,432 | A | * | 4/1973 | Eaves et al. | 464/35 |
| 4,164,879 | A | * | 8/1979 | Martin | 82/158 |
| 4,189,162 | A | * | 2/1980 | Rasmussen et al. | 279/4.06 |
| 4,198,180 | A | * | 4/1980 | Schultz | 408/9 |
| 4,591,299 | A | * | 5/1986 | Eckman | 408/1 R |
| 4,624,608 | A | * | 11/1986 | Shiomi et al. | 408/56 |
| 4,631,992 | A | * | 12/1986 | Eckman | 81/470 |
| 4,693,646 | A | * | 9/1987 | Andrews | 409/136 |
| 4,790,390 | A |   | 12/1988 | Sweeny | 173/17 |
| 4,865,495 | A |   | 9/1989 | Hinds | 408/56 |
| 4,880,064 | A | * | 11/1989 | Willoughby et al. | 173/178 |
| 4,951,578 | A | * | 8/1990 | von Haas et al. | 409/136 |
| 5,149,232 | A | * | 9/1992 | Eckman | 408/137 |
| 5,660,510 | A | * | 8/1997 | Taniguchi et al. | 409/136 |
| 5,702,211 | A | * | 12/1997 | Roemer et al. | 408/56 |

(Continued)

FOREIGN PATENT DOCUMENTS

DE 126 793 A1 5/1983

(Continued)

*Primary Examiner*—Monica Carter
*Assistant Examiner*—Michael W. Talbot
(74) *Attorney, Agent, or Firm*—Baker & Hostetler LLP (57) ABSTRACT

In a valve disposed between a fluid supply and a socket of a chuck and configured to regulate the flow of the fluid to the socket. There is a seal screw for modulating a preload tension. This seal screw has a first sealing surface. The valve further includes a second sealing surface in opposing relation to the first sealing surface and an elastomer seal ring disposed between the first sealing surface and the second sealing surface. The valve is configured to form a seal between the first sealing surface, the second sealing surface, and the elastomer seal in response to a force less than or equal to the preload tension being exerted in line with the seal screw. In this manner, the valve is configured to allow the flow of the fluid between the first sealing surface and the second sealing surface in response to a force exceeding the preload tension being exerted in line with the seal screw.

22 Claims, 5 Drawing Sheets

U.S. PATENT DOCUMENTS

| | | | |
|---|---|---|---|
| 5,707,186 A * | 1/1998 | Gobell et al. | 409/136 |
| 5,860,776 A * | 1/1999 | Sato et al. | 409/233 |
| 5,947,657 A * | 9/1999 | Lipohar et al. | 408/97 |
| 6,105,595 A | 8/2000 | Jensen | 137/15 |
| 6,601,857 B1 * | 8/2003 | Richmond | 279/20 |
| 6,644,900 B1 * | 11/2003 | Sugata et al. | 409/136 |
| 6,726,412 B1 * | 4/2004 | Sugata et al. | 408/57 |
| 2003/0152431 A1 * | 8/2003 | Jansen | 408/56 |

FOREIGN PATENT DOCUMENTS

| | | |
|---|---|---|
| DE | 4010177 A1 * | 10/1991 |
| EP | 464335 A2 * | 1/1992 |
| EP | 758 568 A1 | 2/1997 |

* cited by examiner

FLUID CHUCK DEVICE AND METHOD

FIELD OF THE INVENTION

The present invention generally relates to chuck or socket devices and methods. More particularly, the present invention pertains to a fluid-conduit, tool holding, socket type chuck device and method.

BACKGROUND OF THE INVENTION

When machining a variety of materials such as metals and composites, lubricating fluid and/or air is generally utilized to facilitate heat transfer and/or chip removal. In the case of relatively small items that may be placed within a milling machine, for example, a stream of fluid or coolant may be delivered to the milling site via a fluid line separately arranged from the cutting tool. However, when forming relatively deep holes and/or when machining relatively large items, for example, with portable milling devices, it may be advantageous to deliver fluid more directly to the tip of the cutter. So called fluid chucks are generally utilized to both hold these cutting tools and provide for fluid delivery. These fluid chucks typically include a fluid coupling and a conduit to deliver coolant to the cutting tool.

A disadvantage associated with some conventional fluid chucks is that the flow of fluid is not regulated in connection with the cutting action and thus, fluid may flow out of the cutting tool while no milling action is being performed. In an attempt to overcome this disadvantage, automatic shutoff valves have been incorporated into fluid chucks. However, these known fluid chucks with automatic shutoff valves have not fully overcome these disadvantages and, by way of example, are sometimes susceptible to leaking. Also, these conventional automatic shutoff valves occasionally "stick" and fail to shut off the flow of fluid at the completion of a cutting operation. Problems associated with stuck valves include fluid waste and "back side contamination." The phrase "back side contamination" refers to fluid discharged by the cutting tool after penetration of the material. That is, as the milling tool or drill bit exits through the back of the material, fluid continues to flow and splashes the back side of the material. This problem may be particularly troublesome in the aerospace industry. For example, when machining airframes, back side contamination may foul the interior of the airframe necessitating additional cleaning operations and involving time and money. In addition, there are health concerns associated with cooling fluids. Therefore, back side contamination may have a negative impact on the health of machine operators in the vicinity.

Another disadvantage associated with known fluid chucks having automatic shutoff is that the preload and travel are factory set. The term "preload" refers to an amount of resistance the automatic shutoff mechanism requires to open it for flow, and thus relates to the force required to open the shutoff valve and start the flow of fluid. The term "travel" refers to the degree of movement of the automatic shutoff mechanism required to open the shutoff valve and start the flow of fluid. Optimal preload and travel depend upon a variety of factors such as type and thickness of material machined, diameter of cutting tool, feed rates, and the like. Consequently, the factory settings are usually only optimal for a relatively narrow range of cutting operations.

Accordingly, it is desirable to provide a fluid chuck method and apparatus capable of overcoming the disadvantages described herein at least to some extent.

SUMMARY

The foregoing needs are met, to a great extent, by the present invention, wherein in one respect a fluid chuck device and method is provided that in some embodiments automatically regulates fluid delivery.

An embodiment of the present invention pertains to a valve disposed between a fluid supply and a socket of a chuck. This valve is configured to regulate the flow of the fluid to the socket. The valve includes a seal screw for modulating a preload tension. This seal screw has a first sealing surface. The valve further includes a second sealing surface in opposing relation to the first sealing surface and an elastomer seal ring disposed between the first sealing surface and the second sealing surface. The valve is configured to form a seal between the first sealing surface, the second sealing surface, and the elastomer seal in response to a force less than or equal to the preload tension being exerted in line with the seal screw. In this manner, the valve is configured to allow the flow of the fluid between the first sealing surface and the second sealing surface in response to a force exceeding the preload tension being exerted in line with the seal screw.

Another embodiment of the present invention relates to an apparatus for automatically regulating flow of a coolant to a socket of a chuck. This apparatus includes a means for adjusting a preload tension of a valve within the chuck and a means for forming a seal in response to the preload tension. This seal is formed by an elastomer seal disposed between a first sealing surface and a second sealing surface. The apparatus further includes a means for opening the seal in response to a force greater than the preload tension being applied to the chuck. This force is applied in a direction in line with an axis of the chuck.

Yet another embodiment of the present invention pertains to a method of automatically regulating flow of a coolant to a socket of a chuck. In this method, a preload tension of a valve within the chuck is adjusted and a seal is formed in response to the preload tension. This seal is formed by an elastomer seal disposed between first sealing surface and a second sealing surface. The method further includes opening the seal in response to a force greater than the preload tension being applied to the chuck. This force is applied in a direction in line with an axis of the chuck.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The present invention provides a chuck device and method for the chuck device. In some embodiments, the invention provides for a chuck operable to hold a cutting tool and be driven by a suitable device such as for example a drill, operable to turn the chuck about its axis. The cutting tool may include any suitable end mill, drill bit and the like. Specific example of suitable drill devices include those manufactured by Quackenbush Company, Inc of Crystal Lake Ill., USA. Examples of suitable cutting tools include those configured to convey coolant to or near the cutting tip. The chuck is further operable to be connected to a coolant supply. The coolant may include any suitable liquid and/or gas. More specific examples of suitable coolants include, air, water, oil, a mist of air and oil, and the like.

In other embodiments, the invention provides a method of automatically regulating flow of a coolant to the chuck. In this method, a preload tension of a valve within the chuck is adjusted and a seal is formed in response to the preload tension. This seal essentially prevents coolant from flowing to the socket and thereby to the cutting tool when the tool is not engaged in a cutting operation. The seal is formed by an elastomer seal disposed between first sealing surface and a second sealing surface. The method further includes opening the seal in response to a force greater than the preload tension being applied to the chuck. For example, this force is applied in a direction in line with an axis of the chuck and is utilized during a boring operation to press the cutting tool against a material to be bored.

Advantages of various embodiments of the invention may include, for example: (1) adjustable preload; (2) adjustable travel; (3) reduced envelope size; and/or (4) improved reliability of automatic valve action.

Figure 1:
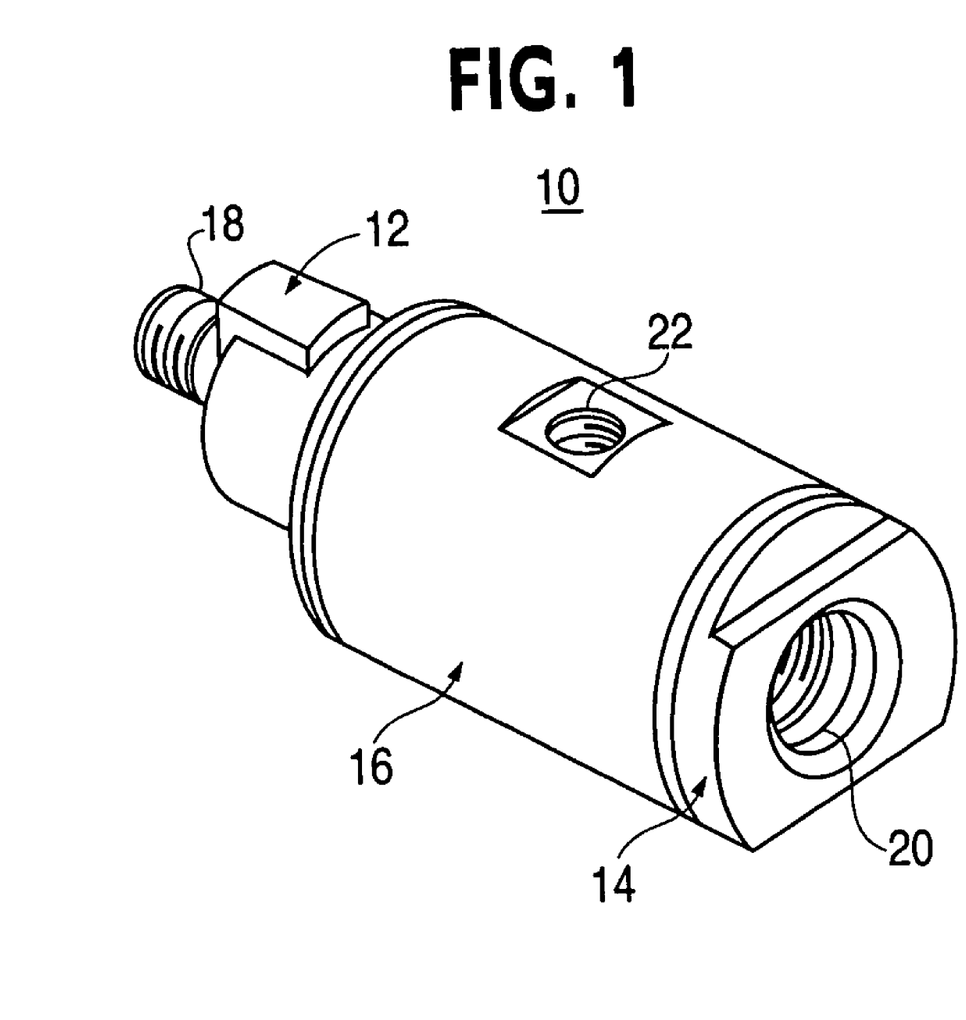
FIG. 1 is a perspective view of a chuck device according to an embodiment of the invention.

Preferred embodiments of the invention will now be described with reference to the drawing figures, in which like reference numerals refer to like parts throughout. As shown in FIG. 1 a chuck 10 includes a spindle driver 12, a spindle 14, and a housing 16. The spindle driver 12 includes a threaded shank 18 operable for attachment to a drill motor. Suitable drill motors include any suitable devices configured to rotate a chuck about an axis. Specific examples of suitable drill motors include at least models S150, S275, S400, and C2AA manufactured by Quackenbush Company, Inc of Crystal Lake Ill., USA. In an embodiment of the invention, the threaded shank 18 is configured to mate with a drive of a suitable drill motor via a 0.357" deep by 9/16"-18 straight thread pitch. While a threaded shank is illustrated, in various embodiments of the invention, the threaded shank 18 maybe replaced with a threaded bore, a tapered fitting, or the like.

The spindle 14 includes a threaded bore 20. This threaded bore 20 is operable for attachment to any suitable drill bit, end mill, or the like. More particularly, suitable drill bits may include those configured to deliver coolant and/or lubricant to or near a cutting tip of the bit. These drill bits may be broadly classified as, "oil hole drill bits" and specific examples of suitable oil hole drill bits include at least those manufactured by Cooper Industries of Huston Tex., USA. In an embodiment of the invention, the threaded bore 20 is configured to mate with a shank of a suitable oil hole drill bit via a 9/16"-18 straight thread pitch. While a threaded bore is illustrated, in various embodiments of the invention, the threaded bore 20 may be replaced with a socket-type fitting, a tapered fitting, or the like.

The housing 16 includes a fitting 22 operable for connection to a coolant supply. For example, a supply line from the coolant supply may be attached to the fitting 22 and, in this manner, supply coolant to the chuck 10. Suitable coolants for use with the chuck 10 include at least oil, water, air, oil/air mist, and the like. In operation, the housing 16 is configured to remain essentially stationary while the remainder of the components of the chuck 10 are rotated by the drill motor.

Figure 2:
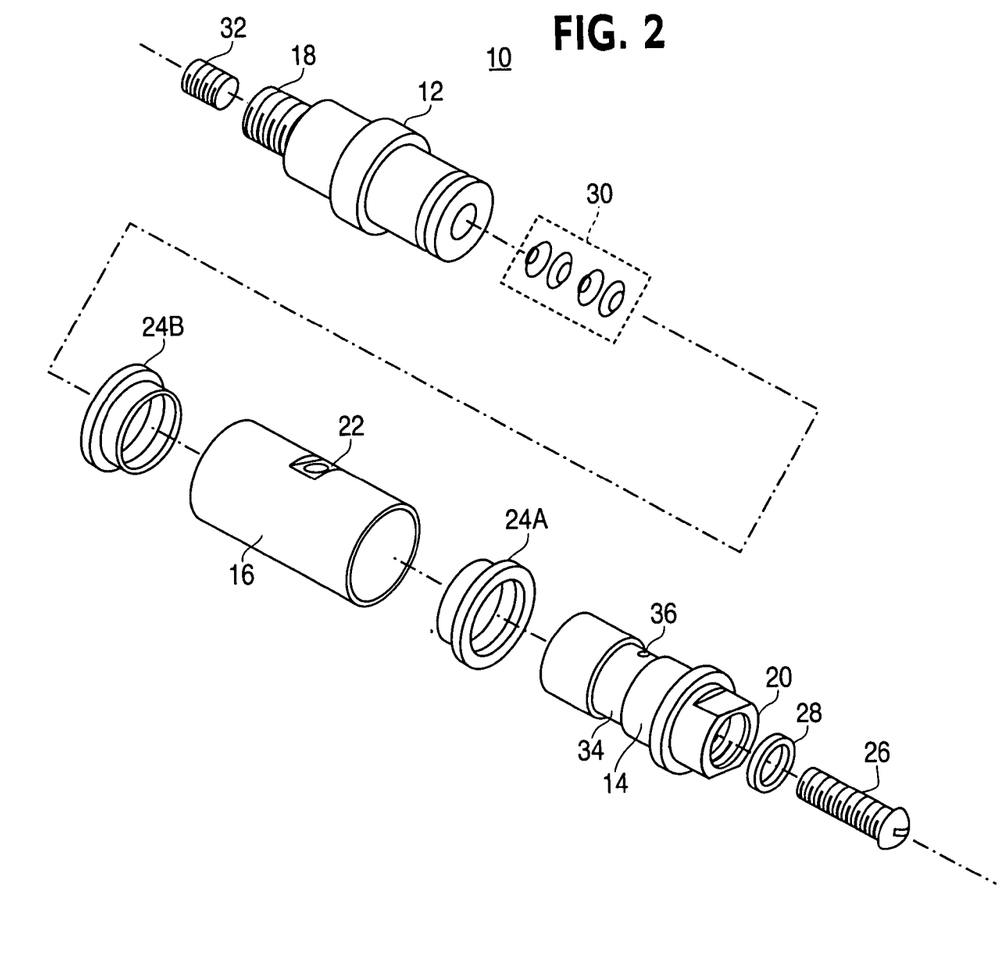
FIG. 2 is an exploded view of the chuck device shown in FIG. 1.

FIG. 2 is an exploded view of the chuck 10 according to FIG. 1. As shown in FIG. 2, the chuck 10 further includes a pair of retainers 24A and 24B, an adjustment screw 26, a seal ring 28, a spring system 30, and a set screw 32. As described in greater detail herein, the adjustment screw 26 is configured to facilitate a variety of tasks including securing the spindle 14 to the spindle driver 12, adjusting a preload tension, and adjusting an amount of travel. The adjustment screw 26 is also referred to herein as a seal screw. Also as described in greater detail herein, the seal ring 28 is configured to elastically conform to various sealing surfaces. In this regard, the seal ring 28 may include elastomers such as rubber, urethane, and/or any other suitably elastic material. The spring system 30 is preferably composed of one or more Belleville spring washers. Examples of suitable Belleville spring washers include those manufactured by Belleville Springs Ltd. of Lakeside United Kingdom. As is generally known, these Belleville springs may be arranged in a variety of manners and thereby modify the force required to deflect the spring system 30 and/or modify the deflect capacity of the spring system 30. Although Belleville-type spring washers are preferred, any suitable spring or spring system may be substituted in place of, or used in combination with, the one or more Belleville springs described.

The spindle 14 includes a channel 34 disposed about the circumference of the spindle 14. This channel 34 is configured to provide a path or conduit through which coolant may flow as the spindle 14 revolves within the housing 16. The spindle 14 also includes at least one orifice 36. The orifice 36 is configured to provide a conduit for the coolant to flow from the channel 34 into the spindle 14.

Figure 3:
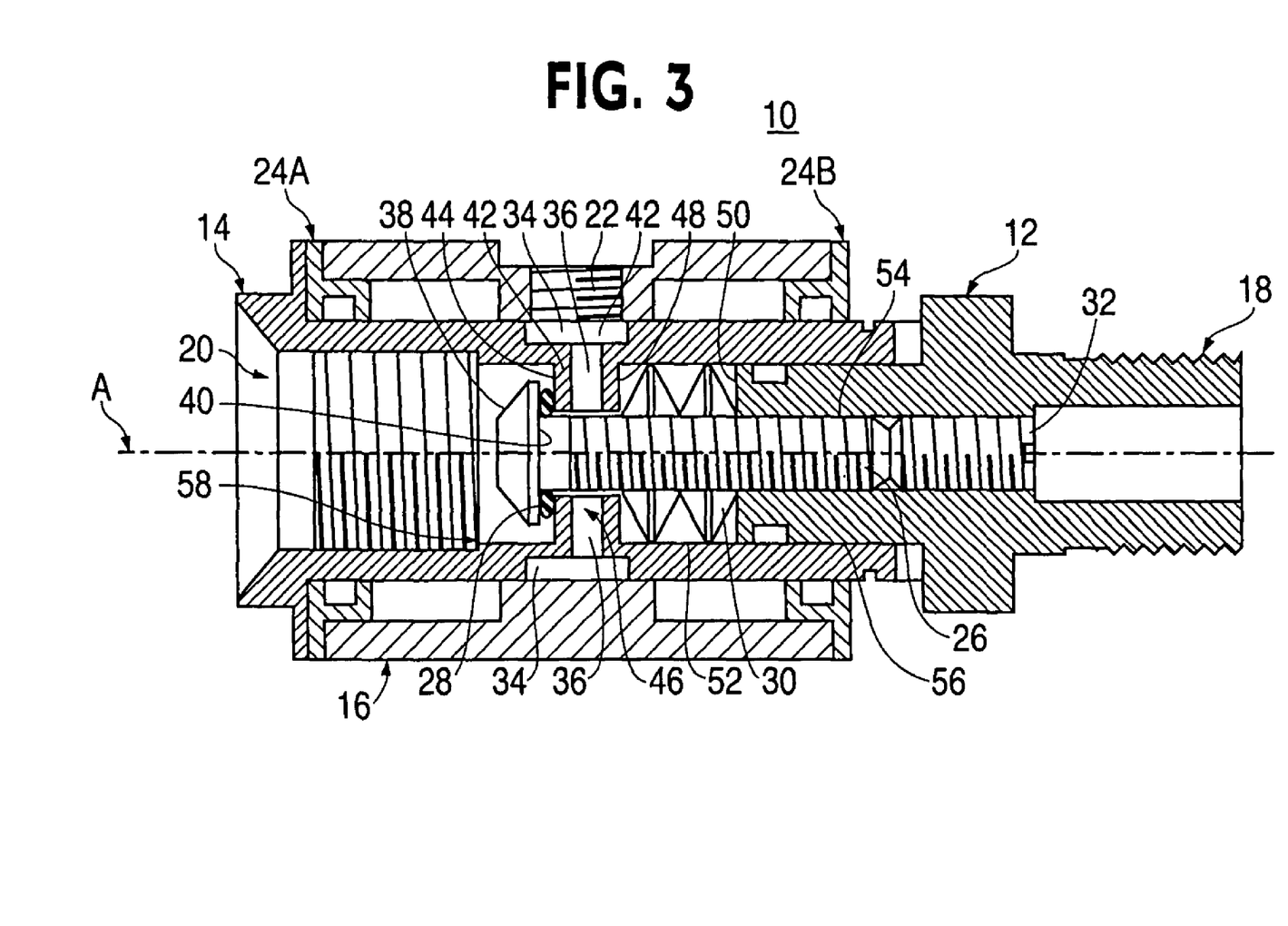
FIG. 3 is a cut away view of the chuck device shown in FIG. 1 in a valve closed position.

FIG. 3 is a cutaway view of the chuck 10 according to FIG. 1. As shown in FIG. 3, the adjustment screw 26 includes a head 38 having a sealing surface 40. In addition, the spindle 14 includes a partition 42 having a sealing surface 44. The chuck 10 includes a valve 46 formed via the interaction of the seal ring 28 disposed between the sealing surface 40 and the sealing surface 44. Furthermore, the partition 42 includes a thrust surface 48 and the spindle driver 12 includes a thrust surface 50. The valve 46 is closed as a result of a preload tension, supplied by the spring system 30, acting upon the thrust surface 48 and thrust surface 50. As shown, the valve 46 is in a closed position. It is an advantage of this arrangement that coolant is essentially prevented from leaking through the valve 46 when in a closed position. For example, minor imperfections of the sealing surfaces 40 and 44, particulate matter within the coolant, and the like may be accommodated by the elastic nature of the seal ring 28.

To facilitate proper alignment and/or action of the spring system 30 within the chuck 10, the spring system 30 is disposed within a spring guide 52. The spring guide 52 and the spring system 30 are preferably configured to conform sufficiently so as to facilitate a relatively smooth and repeatable action of the valve 46. For example, the inside diameter of the spring guide 52 may be formed to a tolerance of about 1 to 10 micrometers greater than the outside diameter of the spring system 30.

The spindle driver 12 includes an axial bore 54, which is sized and includes threads configured to mate with both the adjustment screw 26 and the set screw 32. Prior to boring or drilling operation, the chuck 10 may be assembled by arranging the various components as described herein and threading the adjustment screw 26 into the axial bore 54. The preload tension may further be adjusted via the modulation of the adjustment screw 26 and/or modification of the spring system 30. For example, given a particular number and/or arrangement of Belleville springs, threading the adjustment screw 26 further into the spindle driver 12 may tend to increase the preload tension. In another example, relatively larger adjustments to the preload tension may be produced via the rearrangement and/or addition or subtraction of Belleville springs. In order to set or lock the particular adjustment to the chuck 10, the set screw 32 may be threaded into the axial bore 54 in a manner opposing the adjustment screw 26 until the set screw 32 and adjustment screw 26 meet with sufficient force so as to substantially prevent movement of these two screws within the axial bore 54. Thus, it is an advantage of various embodiments of the invention that the preload tension may be adjusted. It is an additional advantage that this adjusted preload tension may be locked by the action of the set screw 32. It is a further advantage of various embodiments that, as a result of the locking action of the set screw 32, the assembled chuck 10 may be substantially prevented from inadvertent disassembly.

In operation, torque applied to the threaded shank 18 results in rotation about an axis "A" of the spindle driver 12 and the spindle 14. In this regard, torque is applied to the spindle 14 by the spindle driver 12 at an interface 56. This interface 56 is configured to facilitate axial movement of the spindle 14 relative to the spindle driver 12 while substantially preventing rotational movement of the spindle 14 relative to the spindle driver 12. In various embodiments of the invention, the interface 56 may have a variety of different forms. For example, one or more axially oriented ridges or lands and groves may be formed on the mating surfaces of the interface 56. In another example, a keyed channel or other such configuration may be utilized.

Figure 4:
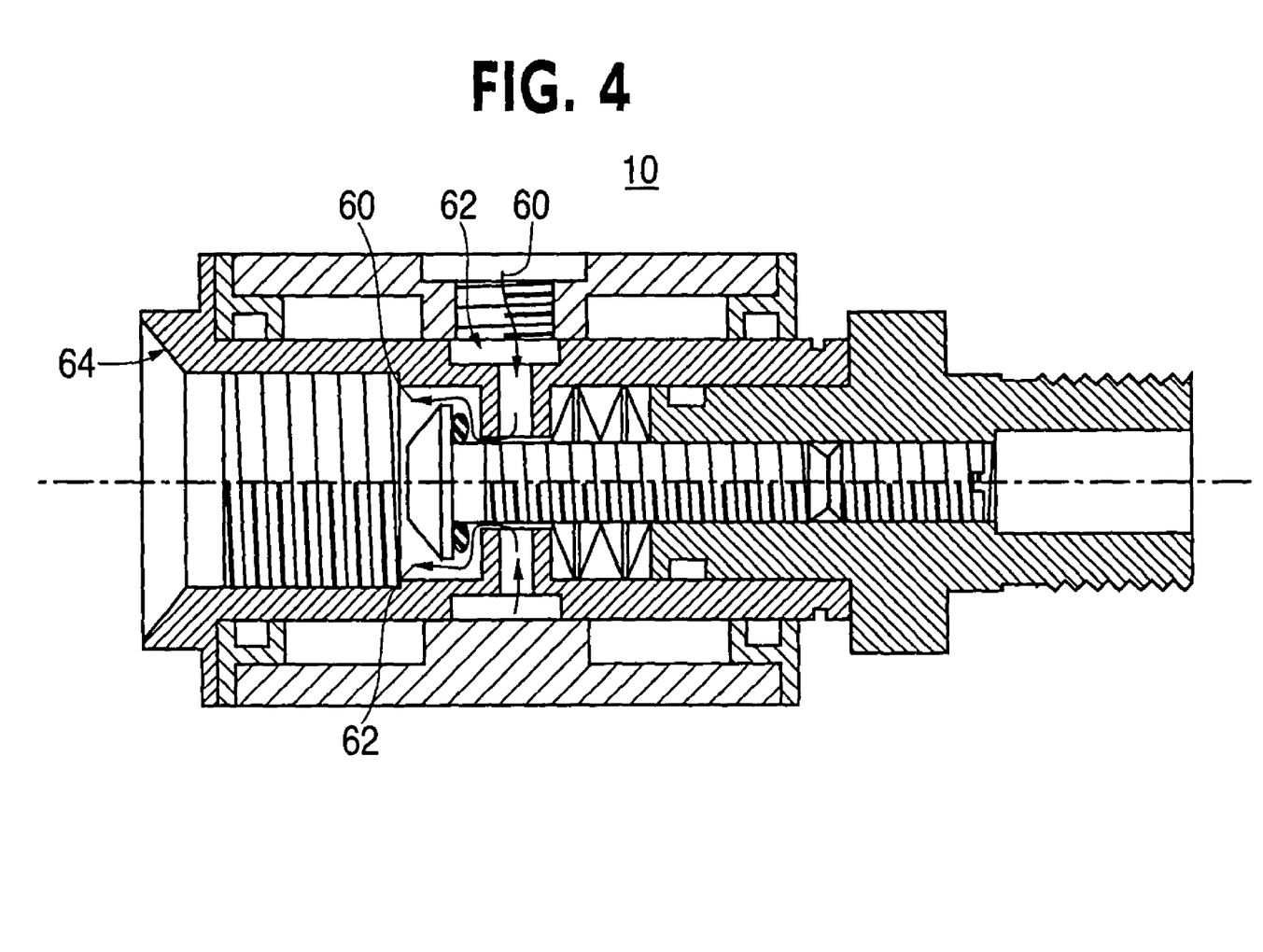
FIG. 4 is a cut away view of a chuck device shown in FIG. 1 in a valve open position.

FIG. 4 is a cut away view of the chuck 10 according to FIG. 1 in which the valve 46 is in an open position. The valve 46 may be opened in response to an axially applied, compressive force upon the chuck 10. For example, in response to a compressive force sufficient to overcome the preload tension as well as any frictional resistance presented by the interface between the spindle driver 12 and spindle 14, the spindle 14 may collapse toward the spindle driver 12 and the valve 46 may open. In operation, this compressive force is generally achieved via the action of a drill motor attached to the threaded shank 18 pressing a drill bit or other tool attached to the threaded bore 20 into a material to be drilled. However, other ways of applying sufficient compressive force in an axial manner to the chuck 10 may be implemented result in modulation of the valve 46.

In order to deliver coolant to or near the cutting tip of a drill bit or other tool secured within the threaded bore 20, various embodiments of the invention provide a conduit 58 through which the coolant may flow from the fitting 22 to the threaded bore 20. It is an advantage of embodiments of the invention that the valve 46 is provided to regulate the flow of coolant through the conduit 58. As a result of the valve 46 being in the open position and as illustrated by flow lines 60 and 62, coolant may flow to the threaded bore from the fitting 22 via the channel 34, the orifice 36, and the valve 46.

In order to substantially prevent a shank of a drill bit inserted in the threaded bore 20 from impeding the action of the valve 46, a stop 64 is provided for in at least some embodiments. For example, the stop 64 may be formed as a result of tapering or chamfering a portion of the threaded bore 20 and thereby, having a remaining portion of the threaded bore 20 retain a relatively smaller diameter. This stop 64 may be formed at a point in the threaded bore 20 sufficiently prior to the head 38 so as to substantially prevent a shank of a drill bit inserted in the threaded bore 20 from impeding the action of the valve 46.

The chuck 10 may further include a plurality of seals configured to substantially prevent coolant from leaking out of the conduit 58. For example an interface between the housing 16 and the spindle 14 may be configured to substantially prevent leakage of coolant. In addition, an interface between the retainers 24A and 24B, the housing 16, and/or the spindle 14 may be configured to substantially prevent leakage of coolant. Furthermore, the interface 56 may be configured to substantially prevent leakage of coolant.

Figure 5:
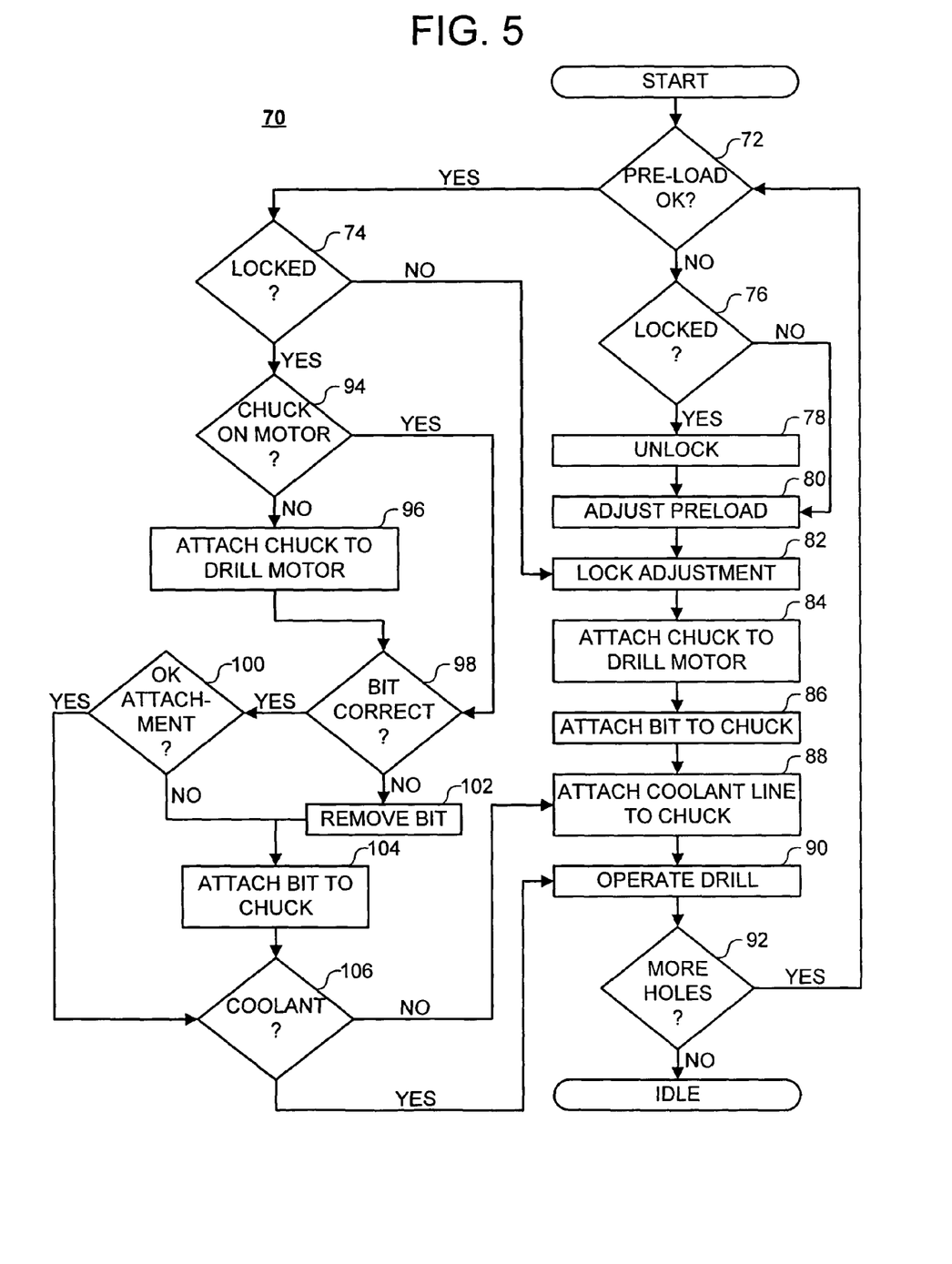
FIG. 5 is a flow diagram according to an embodiment of the invention.

FIG. 5 is a flow diagram of a method 70 according to an embodiment of the invention. In the method 70, a drilling or other machining system may be assembled and utilized to bore one or more holes or otherwise machine a surface. As shown in FIG. 5, the method 70 may be initiated at step 72 by determining whether the preload tension is acceptable. This determination may be performed in a variety of manners. For example, the chuck 10 may be compressed with a plurality of different forces, at least one of which does not collapse the spindle 14 towards the spindle driver 12, and at least one of which does collapse the spindle 14 towards the spindle driver 12. In this manner an approximate preload tension may be determined and preload tension may be adjusted based upon this determination. If it is determined that the preload tension is acceptable or within an acceptable range, step 74 may be performed in preparation to drill a hole or otherwise machine a surface. If it is determined that the preload tension is not acceptable, step 76 may be performed in preparation to adjust the preload tension.

At step 76, it may be determined whether the valve 46 is locked. For example, a tool configured to mate with the set screw 32 may be utilized to modulate the set screw 32. If it is determined that the set screw 32 is not locked against the adjustment screw 26, adjustment of the preload tension may be performed at step 80. If it is determined that the set screw 32 is locked against the adjustment screw 26, the valve 46 may be unlocked at step 78. For example, a tool configured to mate with the set screw 32 may be utilized to loosen the set screw 32 at step 78.

At step 80, the preload tension of the valve 46 may be adjusted. This preload tension may be adjusted with a tool such as for example a screw driver or Allen wrench configured to mate with the head 38. For example, the preload tension may be increased by turning the head 38 in a clockwise manner. In addition, relatively larger adjustments to the preload tension may be performed by disassembling the chuck 10 and modifying the spring system 30. For example, the number and conformation of Belleville springs may be altered. In another example, a helical spring may be replaced with another spring having different tension properties. Furthermore, travel of the chuck 10 may be modulated in a similar manner. For example, turning the head 38 in a clockwise manner may tend to reduce the travel. Following the step 80, the adjustment may be locked at step 82. For example, the set screw 32 may be screwed into the axial bore 54 until the set screw 32 is pressing tightly against the adjustment screw 26. In this manner, the preload tension adjusted at step 80 may be retained until it is desirable to re-adjust the preload tension.

At step 84, the chuck 10 may be attached to a suitable drill motor or drill device. Specific example of suitable drill devices include at least models S150, S275, S400, C2AA, and the like manufactured by Quackenbush Company, Inc of Crystal Lake Ill., USA.

At step 86, a drill bit, end mill, or other suitable cutting tool maybe attached to the chuck 10. For example, a shank of a drill bit may be screwed into the threaded bore 20.

At step 88, a coolant supply may be attached to the chuck 10. For example, a coolant line may be affixed to the fitting 22.

At step 90, one or more holes may be bored or surfaces machined. For example, the drill device or other machining tool may be operated according to manufacturers instructions.

At step 92, it is determined whether more holes are to be bored and/or additional surfaces machined. If it is determined more holes are to be bored, it is then determined if the preload tension is acceptable, at step 72. For example, it may be advantageous to alter the preload tension and/or travel of the chuck based on the anticipated drilling conditions. More particularly, it may be advantageous to alter preload tension and/or travel based upon such drilling conditions as bit wear, material hardness, material thickness, and the like. Alternatively, if it is determined that additional holes are not going to be bored, the assembled drilling apparatus may idle until additional holes are to be bored or the assembled drilling apparatus is disassembled.

If, at step 72, it is determined that preload tension and travel are acceptable then, at step 74, it is determined whether the valve 46 is locked. For example, in a manner similar to step 76, at step 74, a tool configured to mate with the set screw 32 may be utilized to modulate the set screw 32. If it is determined that the set screw 32 is not locked against the adjustment screw 26, the valve may be locked at step 82. If it is determined that the set screw 32 is locked against the adjustment screw 26, it may be determined whether the chuck 10 is adequately attached to a suitable drill motor at step 94.

At step 94, it is determined whether a suitable drill motor is adequately attached to the chuck 10. For example, the model number of the drill motor may be verified and/or the attachment of the chuck 10 to the drill motor may be examined. If at step 94 it is determined a suitable drill is not adequately attached to the chuck 10, the chuck 10 may be properly attached to a suitable drill motor at step 96. If at step 94 it is determined a suitable drill is adequately attached to the chuck 10, it may be determined if a proper bit is attached to the chuck 10 at step 98.

At step 98, it is determined whether a proper bit is attached to the chuck 10. In this regard, it is generally known that different sized holes are typically bored utilizing bits having a corresponding size. In addition, different drill bits may be optimized for particular materials. Therefore, depending upon these and other factors it may be determined if a proper bit is attached to the chuck 10. If at step 98 it is determined that a proper bit is attached to the chuck 10, it is determined if the bit is properly attached to the chuck 10 at step 100. If at step 98 it is determined that no bit or an improper bit is attached to the chuck 10, the improper bit, if present, may be removed at step 102 and an appropriate bit may be properly attached to the chuck 10 at step 104.

At step 100, it is determined if the bit is properly attached to the chuck 10. For example, the degree to which a bit has been inserted into the threaded bore 20 may be evaluated according to manufacturers specifications. If at step 100 it is determined that a bit is not properly attached to the chuck 10, the appropriate bit maybe properly attached to the chuck 10 at step 104. Following step 104 or in response to determining the appropriate bit is properly attached to the chuck 10 at step 100, it is determined whether a coolant supply it attached to the chuck 10 at step 106.

At step 106, it is determined whether a coolant supply is functionally attached to the chuck 10. For example, it may be determined if a coolant supply line is attached to the fitting 22. In addition, it may be determined if a coolant supply is properly pressurized and in working order. Furthermore, a compressive force may be placed upon the chuck 10 to verify the functionality of a coolant supply. If it is determined that the coolant supply is not functional, the coolant supply may be functionally attached to the chuck 10 at step 88. If it is determined that the coolant supply is functionally attached to the chuck 10, the drilling system may be operated at step 90 to bore at least hole.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A valve disposed between a fluid supply and a socket of a chuck, the valve being configured to regulate the flow of fluid from the fluid supply to the socket, the valve comprising:
   a shank;
   a seal screw that threadably engages the shank for modulating a preload tension, the seal screw having a first sealing surface;
   a spindle configured for attachment to a tool;
   a second sealing surface disposed on the shank in opposing relation to the first sealing surface;
   a spring disposed between the spindle and the shank and configured to generate the preload tension; and
   an elastomer seal ring disposed between the first sealing surface and the second sealing surface, wherein the valve is configured to form a seal between the first sealing surface, the second sealing surface, and the elastomer seal in response to a force less than or equal to the preload tension being exerted in line with the seal screw, the valve being further configured to allow the flow of the fluid between the first sealing surface and the second sealing surface in response to a force exceeding the preload tension being exerted in line with the seal screw; wherein tightening of the seal screw compresses the spring to increase the preload tension.

2. The valve according to claim 1, wherein the seal screw is further configured to modulate a travel distance between the first sealing surface and the second sealing surface.

3. The valve according to claim 1, further comprising a set screw configured to substantially prevent adjustment of the seal screw when tightened and allow adjustment of the seal screw when loose.

4. The valve according to claim 3, wherein the set screw is further configured to substantially prevent disassembly of the chuck when tightened and allow disassembly of the chuck when loose.

5. The valve according to claim 1, further comprising a spring configured to generate the preload tension.

6. The valve according to claim 5, further comprising a spring guide configured to control non-axial movement of the spring.

7. The valve according to claim 6, wherein the spring includes a plurality of Belleville washers.

8. The valve according to claim 7, wherein an inside diameter of the spring guide is substantially equal to the outside diameter of the spring.

9. The valve according to claim 8, wherein the spring guide is configured to accommodate a variable number of Belleville washers.

10. The valve according to claim 9, wherein the spring guide is configured to accommodate a plurality of Belleville washer configurations.

11. An apparatus for automatically regulating flow of a coolant to a socket of a chuck, the apparatus comprising:
   first means for attachment to a drive;
   second means for attachment to a tool;
   means for adjusting a preload tension of a valve within the chuck by adjusting compression of a spring disposed between the first and second attachment means;
   means for forming a seal in response to the preload tension, wherein the seal is formed by an elastomer seal disposed between a first sealing surface and a second sealing surface; and
   means for opening the seal in response to a force greater than the preload tension being applied to the chuck, wherein the force is applied in a direction in line with an axis of the chuck.

12. The apparatus according to claim 11, further comprising a means for locking the adjusted preload tension.

13. The apparatus according to claim 11, further comprising a means for connecting a supply of the coolant to the chuck.

14. The apparatus according to claim 11, further comprising a means for adjusting a travel distance between the first sealing surface and the second sealing surface.

15. The apparatus according to claim 14, further comprising a means for locking the adjusted travel distance.

16. A method of automatically regulating flow of a coolant to a socket of a chuck, the method comprising:
   adjusting a preload tension of a valve within the chuck by compressing a spring disposed between a shank and spindle of the chuck;
   forming a seal in response to the preload tension, wherein the seal is formed by an elastomer seal disposed between first sealing surface and a second sealing surface; and
   opening the seal in response to a force greater than the preload tension being applied to the chuck, wherein the force is applied in a direction in line with an axis of the chuck.

17. The method according to claim 16, further comprising locking the adjusted preload tension.

18. The method according to claim 16, further comprising connecting a supply of the coolant to the chuck.

19. The method according to claim 16, further comprising adjusting a travel distance between the first sealing surface and the second sealing surface.

20. The method according to claim 19, further comprising locking the adjusted travel distance.

21. The apparatus according to claim 1, wherein the spindle has an open end and the seal screw has a head accessible through the open end.

22. The apparatus according to claim 1, wherein the spindle has a first fluid conduit and the shank has a second fluid conduit and the seal is disposed downstream from the first and second conduits.

* * * * *